(12) United States Patent
Hempel

(10) Patent No.: US 10,008,865 B2
(45) Date of Patent: Jun. 26, 2018

(54) ENERGY STORAGE DEVICE AND METHOD FOR OPERATING IT

(71) Applicant: H-TECH AG, Schaan (LI)

(72) Inventor: Jörg Hempel, Bad Urach (DE)

(73) Assignee: H-TECH AG, Schaan (LI)

( * ) Notice: Subject to any disclaimer, the term of this patent is extended or adjusted under 35 U.S.C. 154(b) by 241 days.

(21) Appl. No.: 14/436,778

(22) PCT Filed: Oct. 11, 2013

(86) PCT No.: PCT/EP2013/071319
§ 371 (c)(1),
(2) Date: Apr. 17, 2015

(87) PCT Pub. No.: WO2014/060319
PCT Pub. Date: Apr. 24, 2014

(65) Prior Publication Data
US 2015/0333543 A1    Nov. 19, 2015

(30) Foreign Application Priority Data
Oct. 19, 2012   (DE) .......................... 10 2012 110 030

(51) Int. Cl.
*H02J 7/00* (2006.01)
*B60L 11/18* (2006.01)
(Continued)

(52) U.S. Cl.
CPC ......... *H02J 7/0021* (2013.01); *B60L 11/1805* (2013.01); *B60L 11/1855* (2013.01);
(Continued)

(58) Field of Classification Search
USPC ...................................................... 320/121
See application file for complete search history.

(56) References Cited

U.S. PATENT DOCUMENTS

| 4,922,397 A | * | 5/1990 | Heyman | ............. H02M 3/3376 363/17 |
| 5,889,385 A | | 3/1999 | Podrazhansky et al. | |

(Continued)

FOREIGN PATENT DOCUMENTS

| DE | 102007041526 A1 | 2/2009 |
| DE | 102011002673 A1 | 7/2012 |
| WO | 2009/146952 A1 | 12/2009 |

OTHER PUBLICATIONS

German Office Action dated Mar. 7, 2016, in connection with corresponding DE Application No. 10 2012 110 030.6 (10 pgs.).
International Preliminary Report on Patentability dated Apr. 30, 2015, in connection with corresponding International Application No. PCT/EP2013/071319 (21 pp.).
International Search Report dated Jul. 31, 2014 from corresponding International Patent Application No. PCT/EP2013/071319; 4 pgs.

*Primary Examiner* — Robert Grant
(74) *Attorney, Agent, or Firm* — Maier & Maier, PLLC

(57) ABSTRACT

An energy storage device and a method for the operation of an energy storage device. In order to state an energy storage arrangement and a method for the operation of the latter, which in their characteristics are adapted to complex requirements and show both high-current and high-energy characteristics, an energy storage arrangement is stated, including: at least one high-current cell and at least one high-energy cell, with the at least one high-energy cell and the at least one high-current cell being connected in parallel, with the cells being charged and/or discharged with a current pulse and in the inter-pulse periods a charge balancing taking place between the cells.

17 Claims, 5 Drawing Sheets

(51) Int. Cl.
*H01M 10/44* (2006.01)
*H02J 7/14* (2006.01)
*H01M 10/42* (2006.01)

(52) U.S. Cl.
CPC ....... B60L 11/1862 (2013.01); B60L 11/1866 (2013.01); H01M 10/441 (2013.01); H02J 7/007 (2013.01); H02J 7/0014 (2013.01); H02J 7/0018 (2013.01); H02J 7/0054 (2013.01); H02J 7/0093 (2013.01); *B60L 2240/12* (2013.01); *B60L 2240/545* (2013.01); *B60L 2240/547* (2013.01); *B60L 2240/549* (2013.01); *H01M 2010/4271* (2013.01); *H02J 7/14* (2013.01); *Y02T 10/7005* (2013.01); *Y02T 10/7044* (2013.01); *Y02T 10/7055* (2013.01); *Y02T 10/7061* (2013.01)

(56) References Cited

U.S. PATENT DOCUMENTS

| | | |
|---|---|---|
| 6,075,331 A | 6/2000 | Ando et al. |
| 2006/0098390 A1* | 5/2006 | Ashtiani ................. B60K 6/28 361/502 |
| 2006/0103350 A1 | 5/2006 | Lai |
| 2007/0069693 A1 | 3/2007 | Patino et al. |
| 2012/0212174 A1* | 8/2012 | Ishikawa ............ B60L 11/1809 320/103 |
| 2012/0235473 A1* | 9/2012 | Jiang .................. H01M 2/1072 307/9.1 |

* cited by examiner

ENERGY STORAGE DEVICE AND METHOD FOR OPERATING IT

The present invention concerns an energy storage device and a method for operating an energy storage device.

The reorientation of the generation of electricity on the basis of renewable energy sources, in particular by means of photovoltaics and/or by wind power, increasingly requires efficient storage of the energy generated in order to be able to make the electricity available when it is required.

Moreover, a marked increase is recorded in the case of portable and/or battery-powered devices, in particular for communications and in the trades/crafts area, which are powered by rechargeable batteries or cells. For these devices the capacity is a decisive functional feature. The factors influencing the capacity of the rechargeable battery are, on the one hand, the geometrical size since an increase in the capacity is, by conventional means, achieved by an enlargement of the geometrical dimensions of the cell or battery. On the other hand, the durability or the number of maximum possible charging cycles plays a decisive part as in the case of the usual battery-powered devices the battery or cell mostly fails first, i.e. regarding the durability of the components of such devices the rechargeable batteries or cells are among the most short-lived components.

In particular in the very rapidly developing field of e-mobility with hybrid or electric vehicles the capacity, durability and charging time of rechargeable cells forms a special main area. Moreover, the geometrical dimensions and the weight of rechargeable cells also play an important part.

In the case of rechargeable cells the cell is, depending on its embodiment, discharged up to a maximum of 20% of its capacity. That means that 20% of the energy actually stored in the cell is not available to the end user, as discharging to below a threshold of 20% would lead to irrevocable destruction of the cell.

Moreover, with today's rechargeable cells the cell is also only charged up to 80% of its capacity as further charging to 100% of the cell would take exponentially more time, as upon reaching the end of charge the current is usually limited, as a result of which the last 20% of the capacity is charged at lower current intensities, so that per time unit less energy is stored.

Hence in the case of conventional technologies for rechargeable cells the actual capacity of the cells is not utilised.

Among the rechargeable cells recently the lithium ion cell has proved to be particularly advantageous, as it shows a long lifetime and the number of charging cycles is high compared with other technologies. Lithium ion cells additionally show a high storage capacity as compared with other rechargeable cells.

The lithium ion cells can be divided into high-current cells and high-energy cells. In the case of high-current cells, which are also referred to as high-output cells, for example a larger or thicker eliminator is used in order to make larger currents available. In the case of the high-current cells in comparison with high-energy cells the coating with active material is thinner than in the case of high-energy cells in order to improve the active materials and to shorten the diffusion lengths.

The various types of cells each show characteristics which are advantageous for particular uses. For example, high-current cells are used precisely when for a short time very high currents are demanded, for example in the case of cordless drill/drivers. High-energy cells are, on the other hand, used when a high capacity is demanded of the battery, but the currents are not particularly high.

Among the accumulator cells used today, in particular lithium ion high-current cells are put to use in electrical devices which quickly require a very high current such as battery-powered cordless screwdrivers. Another kind of lithium ion accumulators is represented by the high-energy cells used, for example, in notebooks, as they have a high capacity which is output over a long period of time.

The disadvantage of the high-energy cells consists in the fact that they can provide only low currents for a short time. In the case of the high-current cells the disadvantage is that they can make their high current available for only a short time and that as a rule they have a lower capacity. By the combination of high-current cells and high-energy cells the advantages of both cell types can be efficiently combined with one another, so that in total a lower weight is reached and a rechargeable battery pack is obtained, in the case of which both high currents can be obtained and the advantages of the high-energy cells can be utilised which can make currents available over a long period of time.

The object of the invention is to state an energy storage arrangement and a method of operating the latter which in their characteristics are adapted to complex requirements and show both high-current and high-energy characteristics.

The object is achieved by the features of the independent claims. Advantageous embodiments can be seen from the sub-claims.

The invention is based on the idea of interconnecting both high-energy cells and high-current cells in a rechargeable power pack and controlling the charging and discharging processes in such a way that the rechargeable power pack overall experiences a homogeneous capacity distribution over the different cells in and after the respectively occurring load conditions by means of capacity balancing or charge balancing and hence achieves a longer service life but also an increased effective capacity in comparison with rechargeable power packs that consist only of high-energy cells or of high-current cells.

In this case advantageously a current pulse is used for charging and/or pulsed discharging is carried out. This current pulse or the pulsing during discharge is adjusted as a function of the characteristics and the number of the cells in the rechargeable power pack in such a way that between the current pulses there are periods making it possible for load balancing between the two kinds of cells. As a result the rechargeable power pack is able, after a load requirement needing a high current, to recharge the high-current cells with energy from the high-energy cells. In that way the high-current cells can, upon the next high-current requirement, supply this current without the high-energy cells going to their loading limit. Likewise, in the case of a long lasting constant load requirement which is met by the high-energy cells, the high-current cells can recharge the high-energy cells. As a result balancing of the charging between the high-current cells and the high-energy cells is achieved which finally leads to an increased usability of the capacity.

The energy storage arrangement according to the invention shows an extended service life as compared with conventional energy storage arrangements in particular as a result of the controlled and/or homogeneous charging/discharging processes.

For that purpose, the characteristics of the different cell types are combined with one another in an optimum manner. With the energy storage arrangement according to the invention, by the combination of high-current and high-energy cells in one rechargeable power pack both high currents and also high capacity can be provided.

By the use of an adaptive current pulse for charging, charge balancing can hence take place systematically between the two cell types, in that during the charging intervals the high-energy cell can work as a load for the high-current cell, as a result of which an improved charging process is produced for the high-current cell, as due to the load of the high-energy cell in the high-current cell a negative current pulse occurs that counters the formation of dendrites in the high-current cell. This additionally brings about an extension of the life cycles of the energy storage arrangement.

By means of monitoring during discharging and an adaptive activation of pulsing during discharging charge balancing between the two cell types can take place systematically. The pulsing hence represents brief current limiting in which the cells can carry out charge balancing among one another via a controlled bridge switch.

As a consequence the energy storage arrangement can be used for applications for which high currents are required for a short time, but for which also over relatively long periods of time a sustained base load with lower currents is applied. Besides battery-powered machines, the energy storage arrangement according to the invention in particular suitable for use in electric vehicles, as here during accelerating high currents are demanded and at a constant speed over longer periods also lower currents flow. Moreover, the current demand profile for electric vehicles is very varied as a result of which both the characteristics of high-current cells, for example during strong acceleration, and of high-energy cells for example at constant medium speed take effect.

By means of a parameterised controlled connection in parallel of high-current cells and high-energy cells within this stress cycle loading and zero load stress, charge balancing between the high-current cells and high-energy cells is fostered.

Due to the use of an adaptive current pulse for charging and/or due to an adaptation or control of the discharge based on the states of the cells, an optimum capacity can be set so that the cells are charged quickly and completely, but can also be discharged more deeply than without a combination and hence the stored energy can be completely utilised.

In particular an energy storage arrangement is stated comprising at least one high-current cell and at least one high-energy cell, with the at least one high-energy cell and the at least one high-current cell being connected in parallel, with the cells being charged and/or discharged with a current pulse and in the inter-pulse periods charge balancing taking place between the cells.

Preferably the energy storage arrangement shows a control unit for controlling the pulse lengths and/or pulse amplitudes of the current pulse for the discharging and/or discharging of the cells. Preferably the number of high-current cells is smaller than the number of high-energy cells, as a result of which the charge balancing between the two cells is controlled.

Preferably the number of high-current cells makes up about ⅓ and the number of high-energy cells makes up ⅔.

In a preferred embodiment a first switch unit is arranged upstream of at least the high-energy cell and/or a second switch unit is arranged upstream of at least the high-current cell. In particular, the switch unit controls the discharging and/or charging process of the high-energy cell and/or of the high-current cell. In this case, pulsing of the at least one switch unit by means of the control unit for controlling the pulse lengths and/or pulse intervals of the current pulse during charging and/or discharging of the cells is advantageous.

In particular the at least one switch unit makes possible controlled current feed and/or controlled current consumption from the associated cell for a predetermined time and brings about periodic pulsing of the current feed and/or current consumption.

At least one current measurement device and/or voltage measurement device and/or temperature measurement device can be provided, their measured values being used to control the charging and/or discharging process(es).

In addition upstream of the connection in parallel of the at least one high-current cell and the at least one high-energy cell a third switch unit is arranged that serves to limit the current for both cells.

Advantageously the pulsing of the first switch unit for the at least one high-current cell has been coordinated with the pulsing of the second switch unit for the at least one high-energy cell.

In a further embodiment the at least one high-current cell and the at least one high-energy cell are coupled via a fourth switch unit in order to make charge balancing possible and/or to actively control it or to connect one or another cell as a load to the other cell.

At the same time, the fourth switching unit is closed in order to permit a flow of current from the high-current cell into the high-energy cell or vice-versa and/or the fourth switching unit is pulsed in order to achieve current limiting during discharging or during charge balancing.

By closing the fourth switch unit during the inter-pulse periods the at least one high-current cell is loaded with a load pulse. In this case the high-energy cells can also, as a function of the charging state of the at least one high-energy cell, by closing of the fourth switch unit be loaded with a load pulse and/or represent a load or sink for the high-current cells.

Preferably the third switch unit is controlled as a function of the charging state of the at least one high-current cell and/or of the at least one high-energy cell.

In this case the charging current flows during a current pulse via the third and fourth switch units into the at least one high-current cell and the at least one high-energy cell. The first or fourth switch unit is pulsed during discharging upon reaching the end of discharge voltage of the high-energy cells or of the high-current cells.

In particular a current flows, during a pulsed discharging process in the inter-pulse periods or during rest periods offload with a closed fourth switch, from the at least one high-energy cell into the at least one high-current cell in order to recharge the latter.

As a matter of principle the current from the energy storage arrangement can be limited during a discharging process by means of one of the switch units. For that purpose at least one of the switches is controlled in such a way that upon the end of discharge voltage of one of the two cell types being reached, current limiting by pulsing of one of the switches takes place. The current pulse switches back and forth between a low level of zero amps and a fixed positive current value. The control unit is advantageously connected to the first, second, second, third and/or fourth switch unit(s), in order to feed a switch pulse to each of them to bring about opening and/or closing of the respective switch, with the control unit remaining connected to the current, voltage and/or temperature measuring devices in order to receive measured signals from the latter. In particular the length of the current pulses and/or of the inter-pulse periods can be adjusted as a function of the measured state of the two cell types.

In addition, to achieve the object a method was stated for the charging of an energy storage arrangement comprising a connection in parallel of at least one high-current cell and at least one high-energy cell, comprising the steps: feeding a current pulse to the high-current cells and the high-energy cells; upon reaching the end of charge voltage of the high-current cells or of the high-energy cells switch-off of the feeding of the current pulse to the corresponding at least one cell; further charging of the other one of the two cells up to the reaching of the end of charge voltage of the other one of the two cells.

Preferably during an inter-pulse period between the current pulses a switch is closed between the two high-current cells and high-energy cells connected in parallel in order to permit a flow of current from the high-current cells to the high-energy cells.

Moreover, a method for the discharging of an energy storage arrangement is stated, comprising at least one high-current cell and at least one high-energy cell which are connected in parallel, comprising the steps: monitoring of end of discharge voltage, current flow and/or temperature of the at least one high-current cell and/or of at least one high-energy cell; upon the exceeding of a limit value of the states, for example end of discharge voltage, current flow or temperature, limiting of the discharge current from the high-energy cell or from the high-current cell by pulsing of a switch, with as a result of the closing of a switch between the two high-current cells and high-energy cells connected in parallel charge balancing taking place between the high-current cells and the high-energy cells.

In particular the switch between the two high-current cells and high-energy cells connected in parallel is controlled and/or pulsed as a function of a state of the high-current cells and/or high-energy cells.

In the following, on the basis of figures, embodiments of the invention are explained which serve for general understanding, but are not to be understood as a restriction of the invention.

Figure 1:
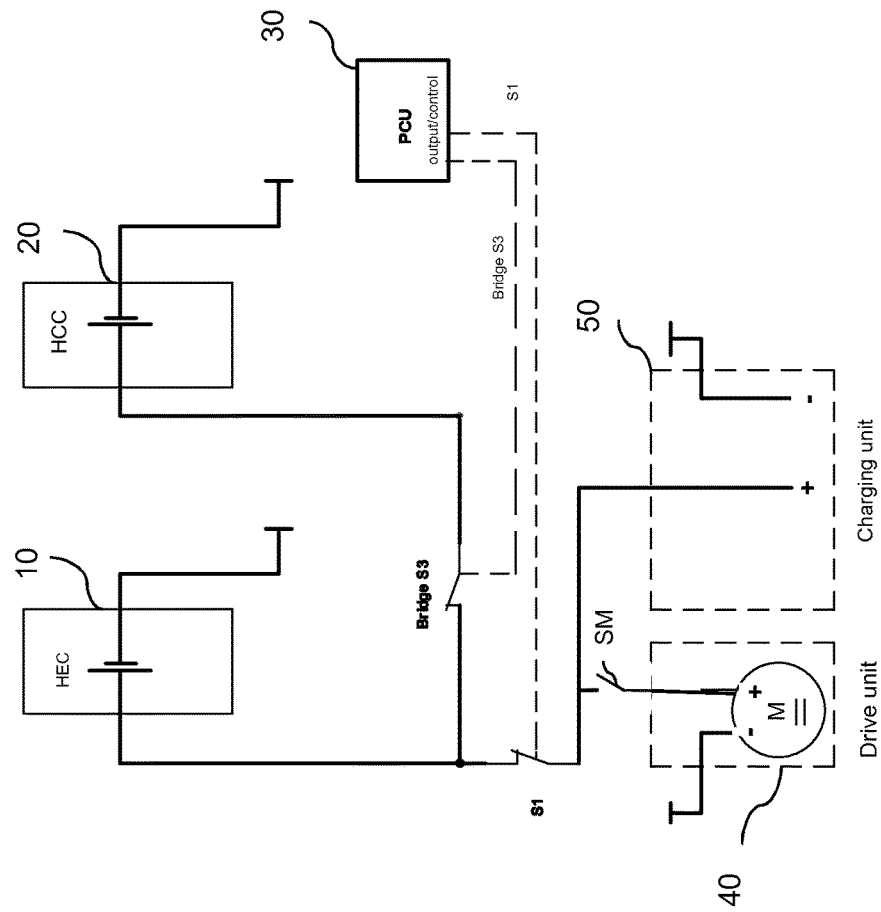
FIG. 1 shows a circuit arrangement in accordance with a first embodiment according to the invention.

FIG. 1 shows a circuit arrangement for an energy storage arrangement in a simple embodiment. As shown in FIG. 1 the energy storage arrangement comprises high-energy cells 10 and high-current cells 20 which are preferably arranged in a rechargeable power pack not illustrated. In each figure only one cell is shown. The invention functions also in the case of the connection in parallel of only one high energy-cell and one high-current cell, but the advantages of the invention can be determined in particular during the use of several cells of the same kind which are connected in series and the respective connection in parallel of the two different kinds of series circuits.

These two groups of cells 10 and 20 are connected in parallel, with the individual high-energy cells 10 and high-current cells 20 in each case being connected in series within the two cell groups 10 and 20. The energy storage arrangement is moreover connected to a control unit 30, a drive unit 40 and a charging unit 50. The charging unit 50 makes the necessary electricity or necessary voltage required for charging the high-energy cells 10 and the high-current cells 20 available. According to the invention a current pulse is used here. The drive unit 40 comprises, for example, an electric motor, but can also be represented by any other load. In order to control and/or to switch on the motor 42 or the load user-dependently, a switch or a switch unit SM is provided which is arranged in the supply cable to drive unit 40. The switch unit SM is, in particular during charging of the high-energy cells 10 and high-current cells 20, opened as otherwise the motor would be driven.

The control unit 30 (PCU—power control UNIT) is, in the embodiment according to FIG. 1, connected to switches S1 and S3 in order to control these two switches S1 and S3. The PCU can be configured as a microcontroller. The switches used in the following in all embodiments, for example S1, S2, S3 SP or SM, can be configured as a simple switch or as a switch unit and can be implemented by means of an electronic circuit.

During normal charging of the high-energy cells 10 and high-current cells 20 the switch S1 is, for example, pulsed by power control unit 30 with a pulse which in the closed state has a current pulse flow to the high-energy cells 10 and high-current cells 20. As an alternative to the pulsed switch S1 a current pulse can also be supplied from the charging unit 50. During the inter-pulse period in which switch S1 is opened, a charge exchange takes place between high-energy cells 10 and high-current cells 20. Immediately after switch S1 has been opened, i.e. no more current flows to the two cell groups 10 and 20, the individual cells of the same type begin a balancing process among one another, as the cells are not all identical and hence balancing among the cells of the same type takes place in order to achieve capacity balancing and thermal balancing.

During the charging process, switch S3 is permanently closed, i.e. during the current pulse the current flows both into high-energy cells 10 and into high-current cells 20. If switch S1 is open, high-current cells 20 represent a sink for high-energy cells 10, so that via switch S3 a current flows from high-energy cells 10 into high-current cells 20. The advantage of this is that the at least one high-energy cell is charged gently and that due to the negative current pulse due to the load of the at least one high-current cell a formation of dendrites is prevented.

In a second possibility for the charging of the energy storage arrangement in accordance with FIG. 1 switch S3 is opened while switch S1 is closed, i.e. with the current pulse from charging unit 50 which is generated by the opening and closing of switch S1 a current pulse flows into high-energy cells 10 and not into high-current cells 20. Only when switch S1 is opened, is bridge switch S3 closed so that a current flow from high-energy cells 10 to high-current cells 20 takes place and hence slow charging of high-current cells 20 is carried out. The time during which switch S1 is closed, i.e. during which the current flows into one or both cell groups, is preferably longer than the time during which switch S1 is open and charge balancing takes place.

In accordance with the embodiment in FIG. 1 only high-energy cells 10 can be separately charged, high-current cells, on the other hand, cannot.

Figure 3:
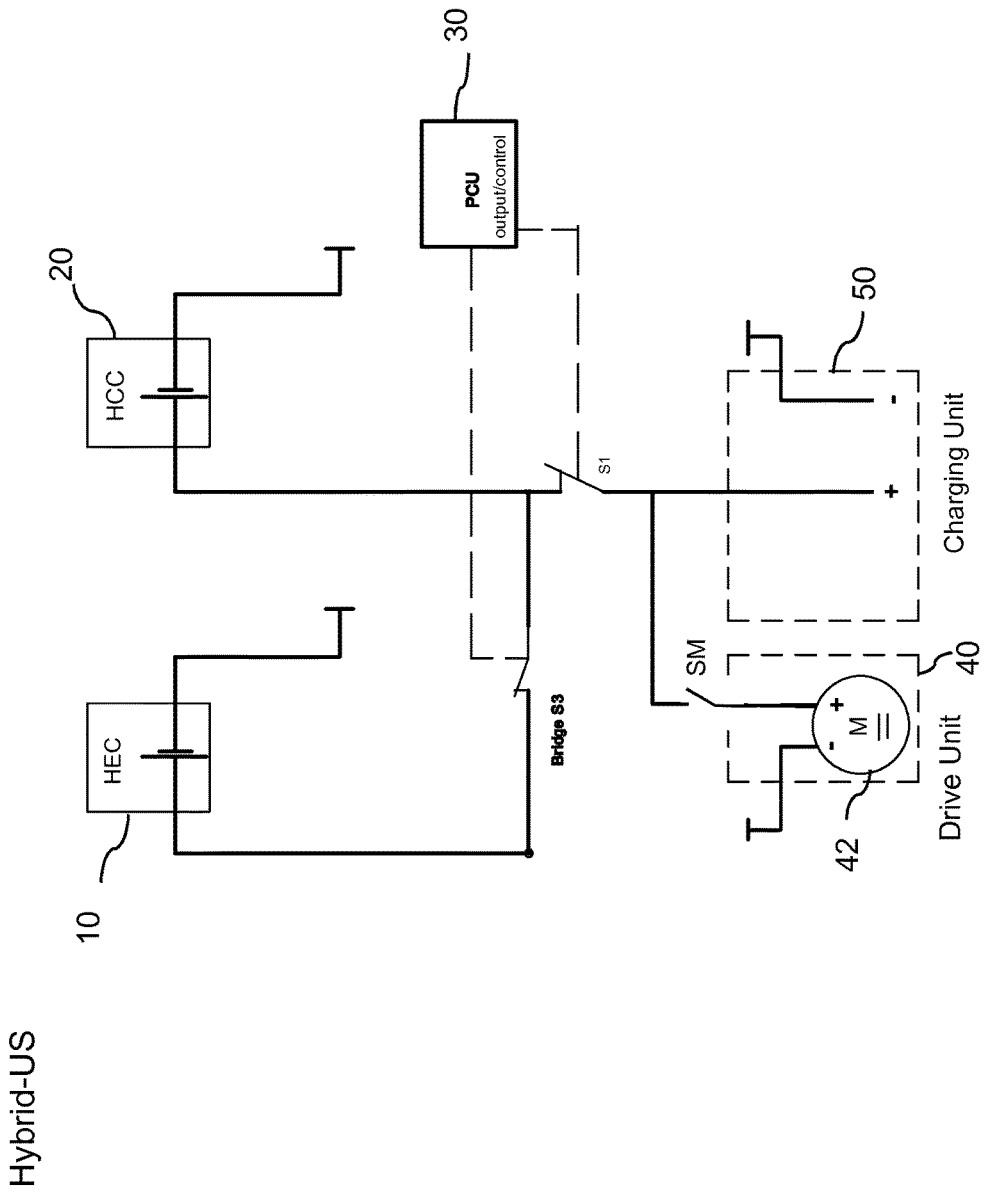
FIG. 3 shows an alternative circuit arrangement in accordance with a third embodiment.

In an embodiment not illustrated only one switch is provided for limiting the discharging current after the connection of the cells in parallel, like switch S1 in FIG. 3. The charging of such an energy storage device takes place with a current pulse which is generated by a charging unit and is simultaneously fed to both types of cells. During discharging upon exceeding of an end of discharge voltage one of the two cell types of the switches in the joint line to the load is pulsed, with in the inter-pulse periods during which the switch is opened and no current flows to the load charge balancing between the two different cell groups taking place.

Figure 2:
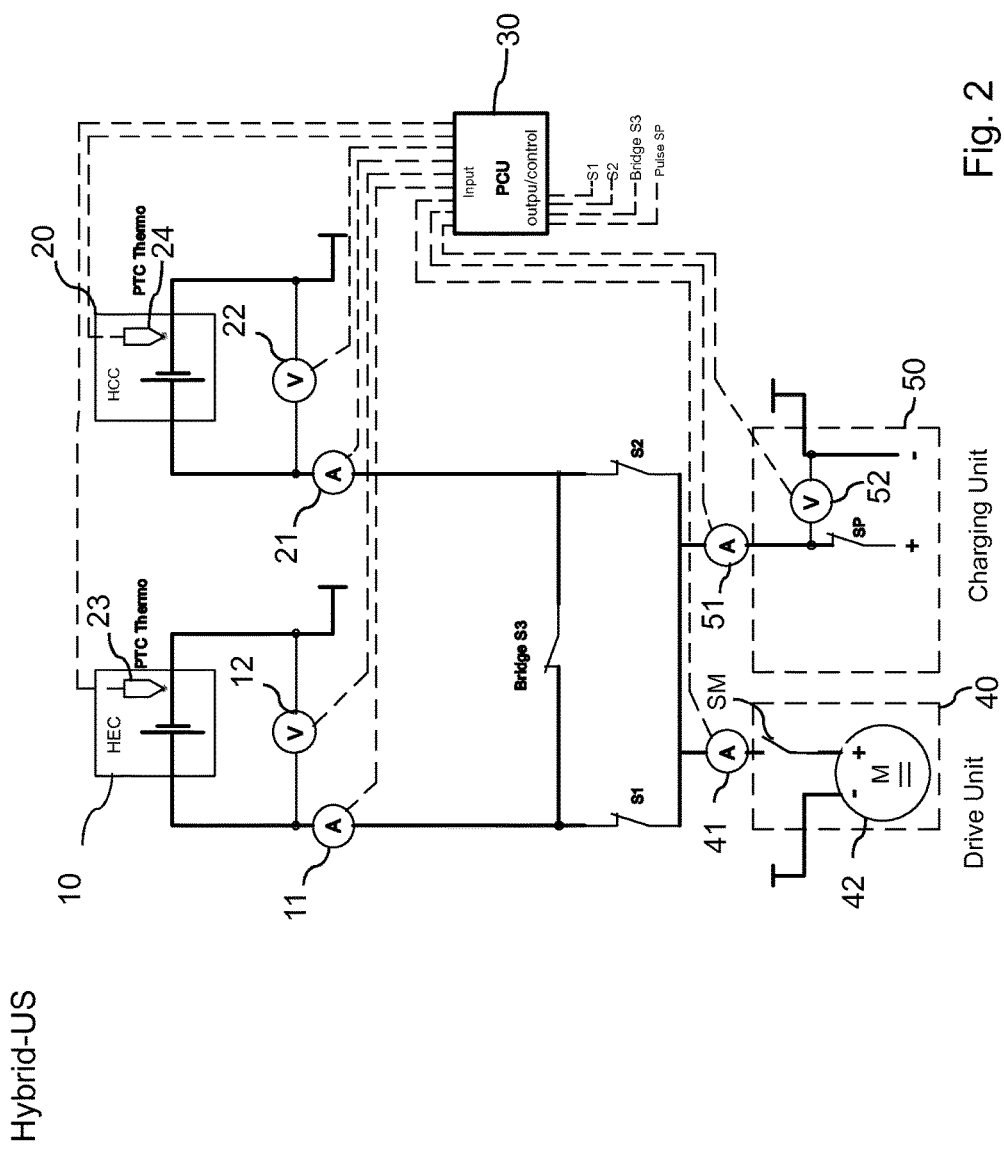
FIG. 2 shows a circuit arrangement in accordance with a second embodiment according to the invention.

In FIG. 2 a further embodiment of the energy storage arrangement according to the invention is shown. Similar to in FIG. 1, in each case high-energy cells 10 and high-current cells 20 are used which are connected in parallel to one another. The energy storage arrangement according to FIG. 2 is also connected to a control unit 30, a charging unit 50 and a drive unit 40. Drive unit 40 is structured in a similar way to drive unit 40 according to FIG. 1. There is a switch or a switch unit SM arranged in the supply cable to drive unit 40. In addition, in the case of this embodiment it is envisaged that an ammeter 41 be connected to the supply cable to drive unit 40. By analogy an ammeter 51 is connected between charging unit 50 and the supply cable to the cells. Charging unit 50 contains a voltmeter 52 and a switch SP. For monitoring in the case of this embodiment, in each case an ammeter 11 is connected up upstream of the high-energy cells 10 and an ammeter 21 upstream of high-current cells 20. The voltage in high-energy cells 10 is monitored with a voltmeter 12 and in high-current cells 20 with a voltmeter 22. The circuit additionally contains switches S1, S2 and S3, which are connected to control unit 30 and are controlled in accordance with the charging method and/or discharging method according to the invention. In order to obtain a clearer overall impression the connections to these switches and to the power control unit are not drawn in. The circuit according to FIG. 2 also shows thermocouples 23, 24 which monitor the temperature in each of the two groups of cells 10 and 20 and transmit their measuring results to control unit 30. Also the measuring results of ammeters and voltmeters 11, 12, 21, 22, 41, 51 and 52 are supplied to control unit 30.

FIG. 3 shows a similar embodiment to the one in FIG. 1. In the embodiment according to FIG. 3 switch S1 is located in the path from charging unit 50 to high-current cells 20. Connected to the energy storage device in accordance with FIG. 3 is likewise a drive unit 40 with a motor 42 or a different load. A switch or a switch unit SM is arranged in the supply cable to drive unit 40. The energy storage device is controlled by a control unit 30 which is connected to switch S1 and bridge switch S3 for their control. Bridge switch S3 is switched into the connection between high-energy cells 10 and high-current cells 20. During charging either a current pulse is fed from the charging unit 50 or switch S1 is pulsed in such a way that in each case a current pulse is supplied to high-current cells 20 and high-energy cells 10 for charging. During charging, bridge switch S3 is closed.

In the case of a load requirement switch SM is closed. Then via switch S1 or S3 by means of power control unit 30 the current flow from high-energy cells 10 and/or from high-current cells 20 to load 42 can be controlled, with it being possible by means of switch S3 to control and/or limit an excessively high flow of current from high-energy cells 10, by this switch S3 being pulsed. If the load decrease from high-current cells 20 is too big, this current flow can be limited with switch S1, with, during the times in which switch S1 is open and switch S3 is closed, a charge exchange taking place between high-energy cells 10 and high-current cells 20, in order to recharge high-current cells 20 with energy from high-energy cells 10.

Both the embodiment according to FIG. 1 and/or FIG. 3 can be supplemented by elements from FIG. 2, for example by insertion of voltmeters and ammeters and/or temperature sensors.

Figure 4:
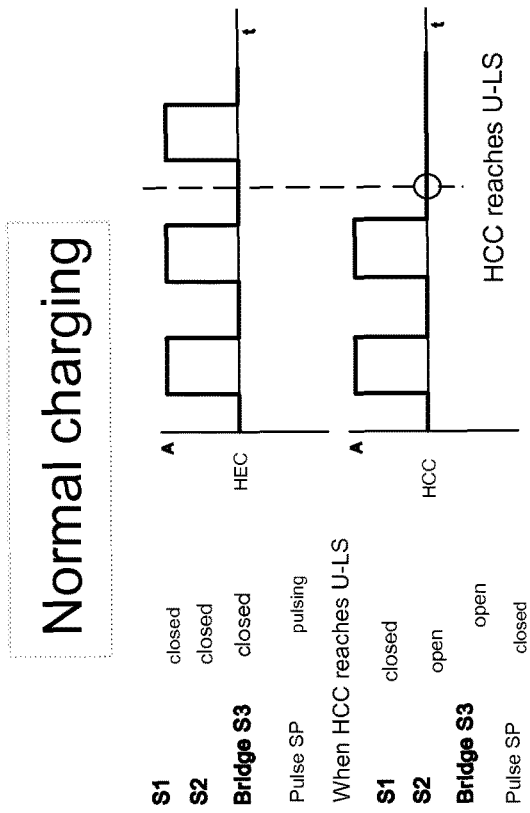
FIG. 4 shows the course of a pulse during charging.

According to FIG. 4 a method for the charging of cell groups 10 and 20 based on the circuit according to FIG. 2 is described. During the normal charging process a voltage is applied to the connections in charging unit 50 so that a current can flow when switch SP is closed. Switch SP is, under the control of control unit 30, operated in pulsing mode so that a current pulse flows to cell groups 10 and 20. In this case the switches S1 and S2 are closed. Also the bridge switch S3 is closed. As the high-current cells show a lower end of charge voltage ULS, for example 4.2V, this end of charge voltage ULS is reached faster in the case of the high-current cells, i.e. it takes fewer current pulses to charge high-current cells 20. If, as shown in FIG. 4, the end of charge voltage ULS of the high-current cells 20 is reached, switch S2 and bridge switch S3 are opened. Switch SP continues to be operated in pulse mode and switch S1 is closed. With this constellation a situation is reached in which high-energy cells 10 are further charged until they reach their end of charge voltage ULS, for example 4.3 V. With the help of control unit 30 the current and voltage values of the cell groups can be monitored and with the thermocouples 23 and 24 in each case also the temperatures of the two cell types in the respective cell groups. Should one of the values recorded lie outside of specified values, with the help of the control unit 30 the pulsing of the individual switches SP can be changed in such a way that a total current limiting for both cell groups or by individual pulsing of the switches S1, S2 or S3 current limiting for one or the other cell group is achieved, in order, for example, to prevent overheating of one of the cell groups.

Figure 5:
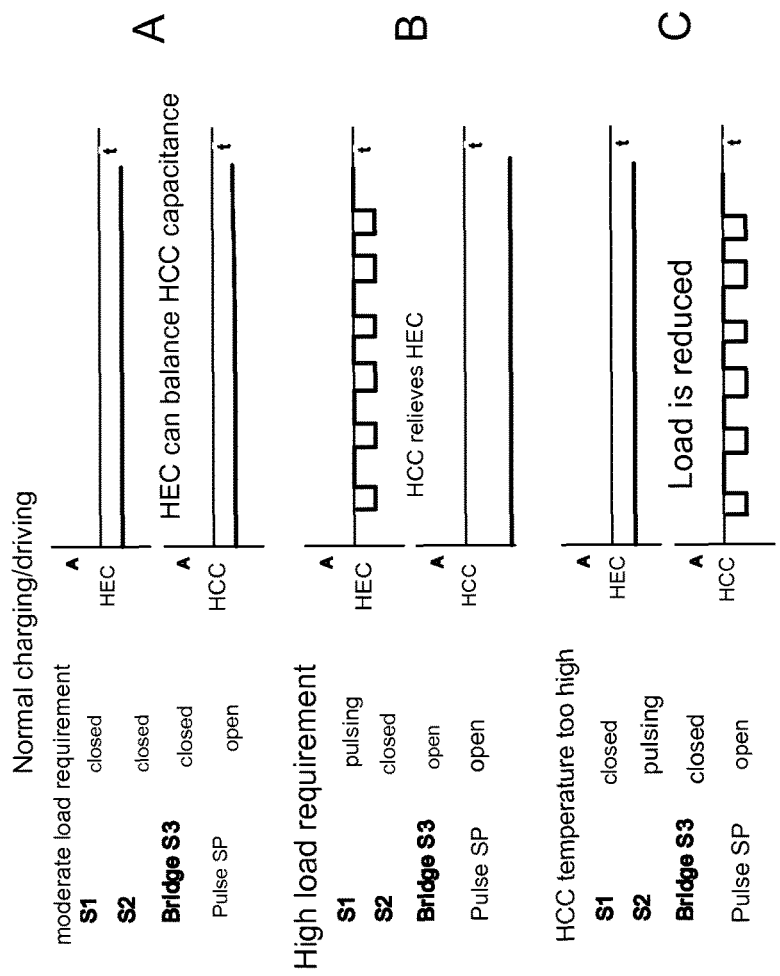
FIG. 5 shows the course of a pulse during discharging for normal discharging (A), for discharging at high demand (B) and (C) at high temperature on the high-current cell.

Below in FIG. 5 the current curve for the two cell groups 10 and 20 in various situations is described.

In situation A the discharge process with moderate requirements is described. For that purpose all switches are closed in accordance with FIG. 2 so that a current can flow to motor 42. Only the switch SP is open. A moderate requirement means, for example, in the case of an electric vehicle that no maximum current requirement or power demand is requested, but that a medium power demand takes place. In this case a normal current flows from both cells within the power limits described by the manufacturer of the accumulator.

In situation B maximum power, for example at full acceleration, is demanded. The load requirement can also be higher than the manufacturer's data. Since particularly in this case the high-current cells 20 can demonstrate their characteristics, the high-current cells 20 supply a continuous current. The high-energy cells are unable to cope with such a maximum power demand and their current flow is limited by a pulsing switch S1, so that the high-energy cells 10 are protected. Due to the pulsing switch S1 and an opened bridge switch S3 the current from the high-energy cells 10 can thus be limited.

In situation C it is shown that the temperature sensor 24 on the high-current cells 20 has detected an increased temperature value. In such a state the switch S1 is closed and the switch S2 is operated in pulsing mode so that the flow of current from the high-current cells is limited and the latter are hence protected. The high-energy cells supply a continuous current that flows via the closed switch S1 to the motor 42.

During charging it is also possible to have a current pulse flow only into the high-energy cells and in the inter-pulse period to charge the high-current cells from the high-energy cells. As the charging pulse into the high-energy cells is, however, longer than the sink pulse or the inter-pulse period, the high-current cells cannot be completely charged in this way. Therefore it is suggested in accordance with the invention that the next current pulse should again flow into both cell groups and that both cell groups should jointly receive the current pulse.

The pulsing takes place in the case of discharging as a function of the current value, i.e. in the case of the high-energy cells the current is limited in order to obtain a maximum from the high-energy cells while protecting the accumulators. While the consumption of current from the high-energy cells is being limited, the current output by the high-current cells rises again as they can output more current. In that way the cells are protected and not overloaded.

The invention claimed is:

1. Energy storage arrangement, comprising:
   at least one high-current rechargeable battery cell and at least one high-energy rechargeable battery cell, with the at least one high-energy rechargeable battery cell and the at least one high-current rechargeable battery cell being connected in parallel,
   with the rechargeable battery cells being charged and/or discharged with current pulses,
   wherein inter-pulse periods are arranged between said current pulses, and
   wherein said at least one high-energy rechargeable battery cell is configured to recharge said at least one high-current rechargeable battery cell during rest periods after a load requirement needing a high current,
   a control unit to control the pulse lengths and/or pulse amplitudes of the current pulse for charging and/or discharging of the rechargeable battery cells,
   wherein, during charging, by using adaptive current pulses, charge balancing takes place systematically between the two rechargeable cell types during the inter-pulse periods as the high-energy rechargeable battery cell works as a load for the high-current rechargeable battery cell during the inter-pulse periods,
   wherein the control unit being connected to a first switch unit, a second switch unit, a third switch unit and/or a fourth switch unit that couples the at least one high current rechargeable battery cell and the at least one high-energy rechargeable battery cell, in order to supply a switch pulse to the latter to open and/or close the respective switch unit, with the switch unit continuing to be connected to the current, voltage and/or temperature measuring devices in order to receive measuring signals from the latter,
   wherein by means of closing of the fourth switch unit during the inter-pulse periods the at least one high-current rechargeable battery cell being discharged by a load pulse.

2. Energy storage arrangement according to claim 1, wherein the first switch unit being arranged upstream of at least the high-energy rechargeable battery cell, and the second switch unit being arranged upstream of at least the high-current rechargeable battery cell.

3. Energy storage unit according to claim 2, wherein the first switch unit is adapted to control the discharging and/or charging process of the high-energy rechargeable battery cell and/or of the high-current rechargeable battery cell.

4. Energy storage arrangement according to claim 2, wherein the control unit is provided for pulsing of the first switch unit for controlling the pulse lengths and/or inter-pulse periods of the current pulse during charging and/or discharging of the rechargeable battery cells.

5. Energy storage arrangement according to claim 1, wherein the first switch unit is adapted to interrupt the supply of current into and/or the current consumption from the associated rechargeable battery cell for a predetermined time and preferably cause a periodic pulsing of the current supply and/or of the current consumption.

6. Energy storage arrangement according to claim 1, further comprising at least one current measuring device and/or voltage measuring device and/or temperature measuring device wherein the measured values are used for the controlling of the charging and/or discharging process.

7. Energy storage arrangement according to claim 1, wherein the third switch unit being arranged upstream of the connection in parallel of the at least one high-current battery cell and the at least one high-energy rechargeable battery cell and serving the purpose of current limiting for both rechargeable battery cells.

8. Energy storage arrangement according to claim 2, wherein the pulsing of the first switch unit for the at least one high-current rechargeable battery cell being adapted to and coordinated with the pulsing of the second switch unit for the at least one high-energy rechargeable battery cell.

9. Energy storage arrangement according to claim 1, wherein the fourth switch unit that couples the at least one high current rechargeable battery cell and the at least one high-energy rechargeable battery cell is closed in order to make possible a flow of current from the high-current rechargeable battery cell into the high-energy rechargeable battery cell or vice versa and/or the fourth switch unit being pulsed in order to achieve current limiting.

10. Energy storage arrangement according to claim 1, wherein during a pulsed discharging process in the inter-pulse periods or during stationary phases offload with a closed connection between the at least one high-energy rechargeable battery cell and the at least one high-current rechargeable battery cell a current flowing from the at least one high-energy rechargeable battery cell into the at least one high-current rechargeable battery cell, in order to recharge the latter.

11. Energy storage arrangement according to claim 2, wherein the current from the energy storage arrangement being able to be limited during a discharging process by means of one of the switch units.

12. Energy storage arrangement according to claim 1, wherein the current pulse switching back and forth between a low level of zero amps and a fixed positive current value.

13. Energy storage arrangement according to claim 2, wherein at least one of the switch units being controlled in such a way that upon reaching the end of discharge voltage of one of the two types of rechargeable battery cells, current limiting is carried out by means of pulsing of one of the switches.

14. Energy storage arrangement according to claim 1, wherein the length of the current pulses and/or of the inter-pulse periods being set as a function of the measured state of the two rechargeable battery cell types.

15. Method for the charging or discharging of an energy storage arrangement comprising a connection in parallel of at least one high-current rechargeable battery cell and at least one high-energy rechargeable battery cell,
   wherein said at least one high-energy rechargeable battery cell is configured to recharge said at least one high-current rechargeable battery cell during rest periods after a load requirement needing a high current,
   the method comprising the steps:
   charging or discharging of at least one high-current rechargeable battery cell and at least one high-energy rechargeable battery cell with current pulses, wherein inter-pulse periods are arranged between said current pulses, controlling the pulse lengths and/or pulse amplitudes of the current pulse for charging and/or discharging of the rechargeable battery cells by use of a control unit, wherein, during charging, by using adaptive current pulses, charge balancing takes place systematically between the two rechargeable cell types during the inter-pulse periods as the high-energy rechargeable battery cell works as a load for the high-current rechargeable battery cell during the inter-pulse periods, wherein the at least one high current rechargeable battery cell and the at least one high-energy rechargeable battery cell are coupled via a switch unit, wherein by means of closing of the switch unit that couples the at least one high current rechargeable battery cell and the at least one high-energy rechargeable battery cell during the inter-pulse periods the at least one high-current rechargeable battery cell being discharged by a load pulse.

16. Method according to claim 15, wherein upon reaching of the end of charge voltage of the high-current rechargeable battery cells or of the high-energy rechargeable battery cells switching-off of the supply of the current pulse to the appropriate rechargeable battery cell and further charging of the other one of the two rechargeable battery cells up to the reaching of the end of charge voltage of the other one of the two rechargeable battery cells, wherein during an inter-pulse period between the current pulses the two high-current rechargeable battery cells and high-energy rechargeable battery cells are connected to each other to allow a flow of current from the high-current rechargeable battery cells to the high-energy rechargeable battery cells.

17. Method according to claim 15, further comprising the steps:

monitoring of end of discharge voltage, current flow and/or temperature of the at least one high-current rechargeable battery cell and/or at least one high-energy rechargeable battery cell;

upon exceeding of a limit value of the end of discharge voltage, current flow or temperature limiting of the discharging current from the high-energy rechargeable battery cell or from the high-current rechargeable battery cell by pulsing of the switch unit, wherein due to the closing of the switch unit between the two high-current rechargeable battery cells and high-energy rechargeable battery cells connected in parallel, charge balancing taking place between the high-current rechargeable battery cells and the high-energy rechargeable battery cells.

* * * * *